United States Patent
Durward

(10) Patent No.: US 10,286,336 B2
(45) Date of Patent: May 14, 2019

(54) EXTRACTION PROCESS USING SUPERCRITICAL CARBON DIOXIDE

(71) Applicant: Critical CO2 LTD, Calgary, Alberta (CA)

(72) Inventor: James Durward, Calgary (CA)

(73) Assignee: MedXtractor Corp., Calgary (CA)

(*) Notice: Subject to any disclaimer, the term of this patent is extended or adjusted under 35 U.S.C. 154(b) by 0 days.

(21) Appl. No.: 15/686,002

(22) Filed: Aug. 24, 2017

(65) Prior Publication Data

US 2019/0060785 A1    Feb. 28, 2019

(51) Int. Cl.
*B01D 11/02*    (2006.01)

(52) U.S. Cl.
CPC ...... *B01D 11/0203* (2013.01); *B01D 11/0296* (2013.01)

(58) Field of Classification Search
None
See application file for complete search history.

(56) References Cited

U.S. PATENT DOCUMENTS 7,790,036 B2 *   9/2010   Cornish ............ B01D 11/0203
                                                        210/634
8,895,078 B2 *  11/2014   Mueller ................ A61K 31/35
                                                        424/725
9,919,241 B1 *   3/2018   Auerbach .......... B01D 11/0203
2006/0225769 A1* 10/2006  Goshi ............... H01L 21/67248
                                                        134/10

FOREIGN PATENT DOCUMENTS

CN        2910471    *  4/2017

OTHER PUBLICATIONS

Wright, Steven A. et al., Sandia Report (2010); Operation and Analysis of a Supercritical CO2 Brayton Cycle, (http://prod.sandia.gov/techlib/access-control.cgi/2010/100171.pdf).
Peace Software of Germany at http://www.peacesoftware.de/einigewerte/co2_e.html.
Universal Industrial Gases, Inc. of Easton, Pennsylvania http://www.uigi.com/co2_conv.html (Copyright 2003).

* cited by examiner

*Primary Examiner* — Ralph J Gitomer
(74) *Attorney, Agent, or Firm* — MBM Intellectual Property Law LLP

(57) ABSTRACT

The present invention provides a method of using $CO_2$ in an extraction process without the use of mechanical pumps to control $CO_2$ density. In particular, the invention relates to a process for extraction of one or more components from a plant material by manipulation of density of $CO_2$ in the extraction vessel via creating a temperature differential between the liquid $CO_2$ supply and the extraction vessel.

10 Claims, 2 Drawing Sheets

EXTRACTION PROCESS USING SUPERCRITICAL CARBON DIOXIDE

FIELD OF THE INVENTION

The present invention pertains to the field of the extraction of components from plant materials, more particularly, for extraction using supercritical carbon dioxide.

BACKGROUND OF THE INVENTION

Supercritical Fluid Extraction (SFE) is the process of separating one component (the extractant) from another (the matrix) using supercritical fluids as the extracting solvent. Extraction is usually from a solid matrix, but can also be from liquids. SFE can be used as a sample preparation step for analytical purposes, or on a larger scale to either strip unwanted material from a product (e.g. decaffeination) or collect a desired product (e.g. essential oils). Carbon dioxide ($CO_2$) is the most used supercritical fluid, sometimes modified by co-solvents such as ethanol or methanol. Extraction conditions for supercritical carbon dioxide occur above the critical temperature of 31° C. and critical pressure of 74 bar.

$CO_2$ can act as an effective solvent in both liquid and supercritical phases. $CO_2$ is known as a "tunable solvent" making it versatile for extracting a multitude of end products by controlling temperature, density and phase. These phase changes create an environment to extract differing weights of components from the plant material.

In the $CO_2$ system the solvating power can primarily be regarded as being a function of density and temperature within a static volume, with the solvent density being the more important factor. Heat provides kinetic energy thereby generally increasing solubility of target solutes, while varying $CO_2$ density provides ability to create a dissolution bias based on the solute's molecular attributes, such as symmetry, size and polarity in relation to the number of super critical carbon dioxide ($SCCO_2$) molecules required to dissolve individual solute molecules.

Currently known extraction methods using $SCCO_2$, involve density manipulation independent of temperature via specialized mechanical pumps to achieve extraction bias towards specific compounds. Typically, mechanical pumps are used to force liquid $CO_2$ at high pressure into a static volume to increase $CO_2$ density to the desired level, whereafter the temperature is manipulated to generate the desired $SCCO_2$ condition. As the $SCCO_2$ flows through the plant material, a variety of components ("solute") can be dissolved in the $SCCO_2$. The extract-laden $SCCO_2$ is then transferred to another vessel where it is depressurized with the subsequent fall in density changing the $SCCO_2$ to gaseous $CO_2$, causing the solute to separate from the gaseous $CO_2$. The gaseous $CO_2$ is then subjected to a heat exchanger where it is cooled to liquid state and then pumped again to repeat the cycle.

For certain plant extracts (such as CBD cannabinoid solubility in $CO_2$ occurs when the density of $CO_2$ is 756 $kg/m^3$—at around 53° C. at ~2814 psi. At this density, the $CO_2$ is in supercritical phase and there are sufficient intermolecular spaces, and the spaces are of sufficient volume to hold CBD molecules in solution. If the density is higher, the spaces may become too small to accommodate the CBD molecules and if the density is too low, the spaces may be too large to hold the CBD in solution. In either case extraction efficiency is not optimal.

Liquid $CO_2$ is generally commercially available in supply tanks, often at ~800 psi at ~21° C., wherein ~67% of $CO_2$ exists in liquid phase and ~33% in gas phase. In this state the $CO_2$ tank is considered full, and combined density may be ~550 $kg/m^3$. If such a supply tank is connected to a constant volume extraction vessel, the pressures would equalize with the extraction vessel containing liquid and gas with a combined density of ~550 $kg/m^3$. This level of density may be insufficient for efficient encapsulation of the desired solute molecules and attempted extractions using this density will result in little or no extract. Therefore, mechanical pumps are used to physically force $CO_2$ into the extraction vessel until the desired density is reached.

U.S. Pat. No. 8,895,078, discloses a method for producing an extract from *cannabis* plant matter, containing tetrahydrocannabinol, cannabidiol and optionally the carboxylic acids thereof, wherein specific temperature/pressure combinations are presented for the various cannabinoids along with the use of mechanical pumps. In the method of this patent, pure $CO_2$ is conveyed via a conduit to a liquefier equipped with a condenser coil, and then liquid $CO_2$ is supplied via a pressurizing pump to a heat exchanger, to be available for the extraction cycle described therein.

In the Sandia National Laboratories 2010 report "Operation and Analysis of a Supercritical Braydon Cycle" (http://prod.sandia.gov/techlib/access-control.cgi/2010/100171.pdf), the descriptions and associated drawings clearly show mechanical pumps being used to control the density.

In extraction processes involving mechanical pumps, as the $SCCO_2$ is forced through the raw material at high rates, the $SCCO_2$ does not become fully impregnated, much less saturated with solute, and is subject to "channeling" whereby the $SCCO_2$ flow finds the path of least resistance, thereby bypassing some of the potential extracts. Different manufacturers have different flow rates and different ways of dealing with efficiency but they all function substantially in the same manner. Moreover, recycling of recovered $CO_2$ in these extraction processes can carry solute over into the pump causing the pump to malfunction and require service. Furthermore, mechanical pumps are expensive, noisy, and require high maintenance and often special infrastructure.

Hydrocarbon co-solvents have also been used in extraction processes involving $SCCO_2$. The hydrocarbon-enhanced extraction processes, however can leave residues in the extracts.

Accordingly, there is need for alternative cost effective and environmentally friendly extraction methods.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method of using $CO_2$ in an extraction process without the use of mechanical pumps to control $CO_2$ density. In accordance with an aspect of the present invention, there is provided a process of extracting one or more components from a plant material, the process comprising: a) providing a liquid-phase $CO_2$ supply at a known temperature; b) providing a predetermined amount of the plant material in a pressure regulated extraction vessel having known/constant volume; c) creating a temperature differential between the liquid-phase $CO_2$ supply and the extraction vessel, wherein the extraction vessel temperature is lower than the temperature of the liquid-phase $CO_2$ supply; d) allowing the liquid-phase $CO_2$ to flow into the extraction vessel due to the temperature differential, while maintaining the temperature differential between the liquid-phase $CO_2$ supply and the extraction vessel to load a target amount of the liquid-phase $CO_2$ to achieve a desired density of $CO_2$ in the extraction vessel; e) heating the extraction vessel to achieve supercritical-phase $CO_2$ at desired predetermined pressure and temperature; f) allowing the supercritical-phase $CO_2$ to reside in the extraction vessel at the predetermined temperature and pressure achieved in step e) for a time sufficient to ensure impregnation of the one or more components in the supercritical-phase $CO_2$; g) cooling the component-impregnated supercritical-phase $CO_2$ so that the component impregnated supercritical-phase $CO_2$ in the extraction vessel changes to component-impregnated liquid-phase $CO_2$; h) transferring the component-impregnated liquid-phase $CO_2$ into a collection vessel and decreasing the density of the liquid-phase $CO_2$ to convert the liquid-phase $CO_2$ into gaseous-phase $CO_2$, thereby allowing the one or more components to be separated from the $CO_2$; i) optionally collecting and cooling the gaseous-phase $CO_2$ in a pre-cooled recapture tank and recycling same for the extraction process.

BRIEF DESCRIPTION OF THE FIGURES

Further features and advantages of the present invention will become apparent from the following detailed description, taken in combination with the appended drawings, in which.

DETAILED DESCRIPTION OF THE INVENTION

Figure 1:
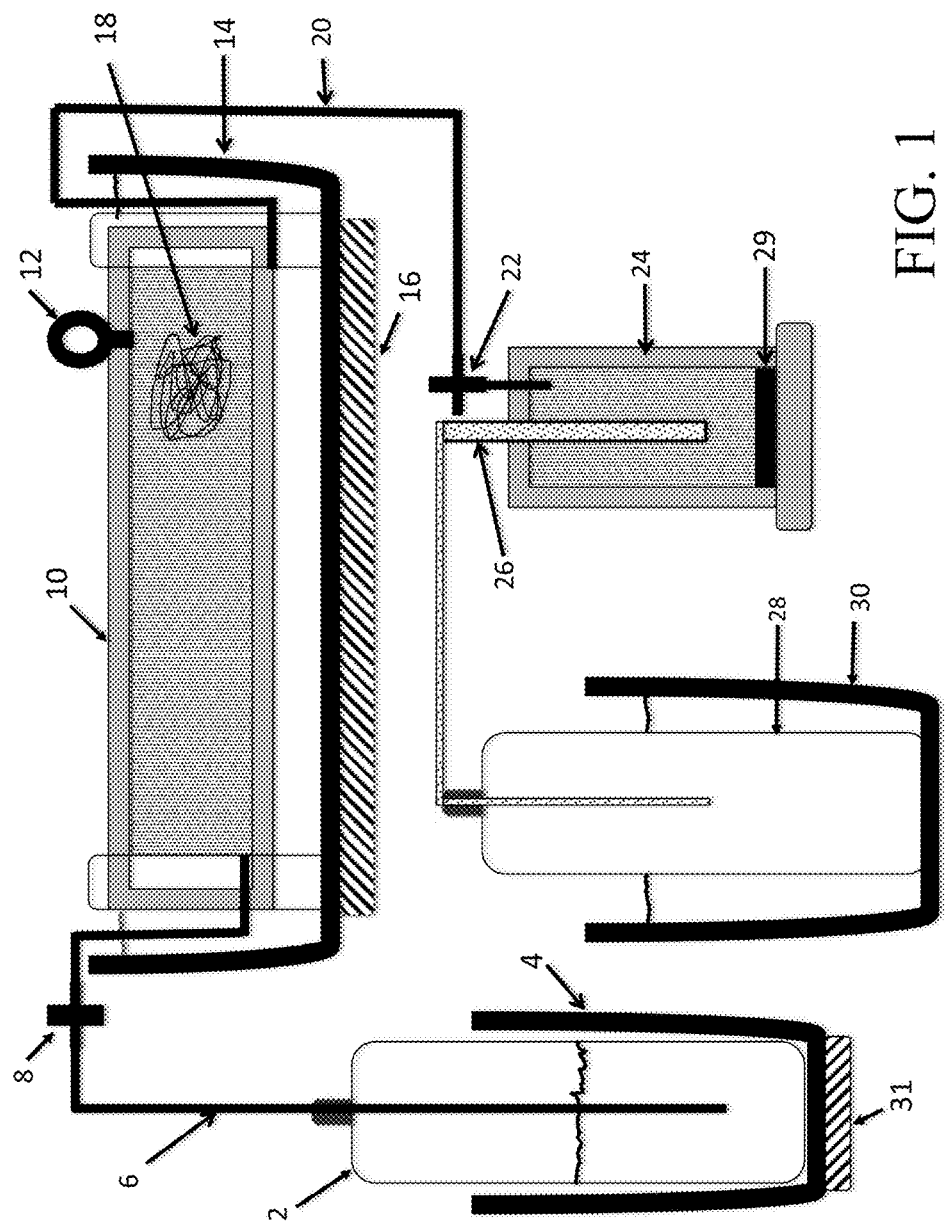
FIG. 1 illustrates a schematic representation of a $CO_2$ extraction plant involving the process in accordance to an embodiment of the present invention.

Unless defined otherwise, all technical and scientific terms used herein have the same meaning as commonly understood by one of ordinary skill in the art to which this invention belongs.

The present invention provides a simplified, cost effective process for controlling phase and density of extraction solvent during extraction of desired components from a plant material, while using supercritical fluid (such as $SCCO_2$), wherein temperature/pressure/density relationship is controlled for maximal extraction selectivity without the use of mechanical pumps.

The inventor of the present invention has surprisingly established that the extraction of surface resident components from plant materials using carbon dioxide can be effectively achieved in the absence of mechanical pumps, by manipulation of density of $CO_2$ in the extraction vessel via creating a temperature differential between the liquid $CO_2$ supply and the extraction vessel. The process of the present invention requires less upfront cost, and lower ongoing production and maintenance costs.

The present invention provides a method of controlling phase change and density of $CO_2$ for extraction of desired extracts from a plant material using a combination of liquid $CO_2$ and supercritical $CO_2$ ($SCCO_2$). The method comprises providing a liquid-phase $CO_2$ supply at a known temperature and providing a predetermined amount of the plant material in a pressure regulated extraction vessel having known/constant volume. A temperature differential is created between the liquid-phase $CO_2$ supply and the extraction vessel, such that the extraction vessel temperature is lower than the temperature of the liquid-phase $CO_2$ supply. After achieving the desired temperature differential, the liquid-phase $CO_2$ is allowed to flow into the extraction vessel due to the temperature differential, while maintaining the temperature differential between the liquid-phase $CO_2$ supply and the extraction vessel, to load a desired/target amount of the liquid-phase $CO_2$ to achieve a desired density of $CO_2$ in the extraction vessel. The extraction vessel is then heated to achieve supercritical-phase $CO_2$ at desired predetermined pressure and temperature, sufficient for dissolving one or more extracts from the plant material.

In another aspect, the present invention provides a process of extracting components from a plant material. The process comprises providing a liquid-phase $CO_2$ supply at a known temperature and providing a predetermined amount of the plant material in a pressure regulated extraction vessel having known/constant volume. A temperature differential is created between the liquid-phase $CO_2$ supply and the extraction vessel, such that the extraction vessel temperature is lower than the temperature of the liquid-phase $CO_2$ supply. After achieving the desired temperature differential, the liquid-phase $CO_2$ is allowed to flow into the extraction vessel due to the temperature differential, while maintaining the temperature differential between the liquid-phase $CO_2$ supply and the extraction vessel, and loading a desired/target amount of the liquid-phase $CO_2$ to achieve a desired density of $CO_2$ in the extraction vessel. The extraction vessel is then heated to achieve supercritical-phase $CO_2$ at desired predetermined pressure and temperature sufficient for dissolving one or more extracts from the plant material. The supercritical-phase $CO_2$ is allowed to reside in the extraction vessel at the desired predetermined temperature and pressure for a time sufficient to ensure impregnation of the one or more components in the supercritical-phase $CO_2$. The component-impregnated supercritical-phase $CO_2$ is then cooled so that it changes to liquid-phase $CO_2$. The liquid-phase $CO_2$ impregnated with one or more components is then transferred into a collection vessel at a lower pressure or into a collection vessel with higher available volume, where density of the liquid-phase $CO_2$ is decreased to convert the liquid-phase $CO_2$ into gaseous-phase $CO_2$, thereby allowing the extracted components to be separated from the $CO_2$. The process optionally comprises collecting and cooling of the gaseous-phase $CO_2$ for conversion into liquid-phase $CO_2$ and recycling same in the extraction process.

The method and process of the present invention are suitable for extraction of one or more components from any plant material, particularly, surface resident components. In some embodiments, the method and process of the present invention are suitable for extraction of one or more cannabinoid components from *cannabis* plant material.

The temperature differential between the liquid-phase $CO_2$ supply and the extraction vessel can be created by heating the liquid-phase $CO_2$ supply and/or cooling the extraction vessel prior to and/or during $CO_2$ loading.

In some embodiments, the warmer liquid-phase $CO_2$ supply is optionally cooled prior to loading same into the extraction vessel.

In some embodiments, the liquid-phase $CO_2$ supply is obtained at a temperature higher than the initial temperature of the extraction vessel, thereby creating the desired temperature differential, and optionally cooling the extraction vessel before and/or during the loading of the liquid-phase $CO_2$ into the extraction vessel.

In some embodiments, the liquid-phase $CO_2$ supply is obtained at a temperature similar to the initial temperature of the extraction vessel, and the temperature differential is created by heating the liquid-phase $CO_2$ supply to a predetermined temperature above the temperature of the extraction vessel, and/or cooling the extraction vessel before and/or during the loading of the liquid-phase $CO_2$ into the extraction vessel.

In some embodiments, the liquid-phase $CO_2$ supply is obtained at a temperature lower than the initial temperature of the extraction vessel, and the temperature differential is created by first heating the liquid-phase $CO_2$ supply to a predetermined temperature above the temperature of the extraction vessel, optionally followed by cooling the extraction vessel before and/or during loading of the liquid-phase $CO_2$ into the extraction vessel.

Cooling of the extraction vessel can be achieved by the methods known in the art. In some embodiments, the extraction vessel is immersed in a heat transfer fluid (coolant) in a fluid bath. In some embodiments, the heat transfer fluid is circulated in a cooling jacket provided around the extraction vessel.

The heat transfer fluid is selected depending upon the desired temperature differential between the $CO_2$ supply and the extraction vessel. Non limiting examples of suitable heat transfer fluid include water, ethylene glycol, diethylene glycol, propylene glycol, Freon, mineral oils, silicone oils, etc. alone or in combination. In some embodiments, the heat transfer fluid is propylene glycol or a mixture of propylene glycol and water. In some embodiments, the heat transfer fluid is cold/hot water.

In some embodiments, the desired density of the liquid-phase $CO_2$ in the extraction vessel is from about 700 kg/m$^3$ to about 850 kg/m$^3$, which is achieved by loading a predetermined amount of liquid-phase $CO_2$.

In some embodiments, the predetermined amount of liquid-phase $CO_2$ to be loaded into the extraction vessel is from about 66% and 100% of the volume available in the extraction vessel.

The amount of liquid-phase $CO_2$ to be loaded into the extraction vessel can be calculated based on the value of the internal volume of the extraction vessel, excluding the plant material mass, and the desired density by using methods known in the art. For example, a correlation chart of $CO_2$ temperature, pressure and density (as shown in Tables 1a & 1b), can be first created using the density calculator such as the one published by Peace Software of Germany at http://www.peacesoftware.de/einigewerte/co2_e.html, as shown in the Table 2 below.

TABLE 1a

CO2 - Temp/Pressure/Density Chart (kg/m3)

| Temp-C. | Temp-F. | Pressure 1000 | Pressure 1100 | Pressure 1200 | Pressure 1300 | Pressure 1400 | Pressure 1500 | Pressure 1600 | Pressure 1700 | Pressure 1800 | Pressure 1900 | Pressure 2000 | Pressure 2100 |
|---|---|---|---|---|---|---|---|---|---|---|---|---|---|
| 24 | 75 | 733 | 757 | 784 | 803 | 816 | 826 | 834 | 843 | 851 | 859 | 867 | 875 |
| 26 | 79 | 696 | 726 | 761 | 783 | 798 | 810 | 819 | 828 | 836 | 845 | 854 | 863 |
| 28 | 82 | 659 | 694 | 737 | 763 | 780 | 793 | 803 | 813 | 822 | 832 | 841 | 851 |
| 30 | 86 | 256 | 657 | 713 | 743 | 762 | 777 | 787 | 797 | 808 | 818 | 828 | 839 |
| 31 | 88 |  | 493 | 675 | 716 | 744 | 763 | 774 | 786 | 797 | 809 | 820 | 832 |
| 32 | 90 |  |  | 638 | 690 | 725 | 749 | 762 | 774 | 787 | 799 | 812 | 824 |
| 34 | 93 |  |  | 562 | 637 | 689 | 722 | 736 | 751 | 765 | 780 | 795 | 809 |
| 36 | 97 |  |  | 486 | 584 | 652 | 694 | 711 | 728 | 744 | 761 | 778 | 794 |
| 38 | 100 |  |  |  | 531 | 616 | 667 | 685 | 704 | 723 | 742 | 761 | 779 |
| 40 | 104 |  |  |  | 478 | 579 | 639 | 660 | 681 | 702 | 723 | 744 | 765 |
| 42 | 108 |  |  |  |  | 533 | 592 | 618 | 643 | 669 | 694 | 720 | 745 |
| 44 | 111 |  |  |  |  | 487 | 545 | 576 | 606 | 636 | 666 | 696 | 725 |
| 46 | 115 |  |  |  |  |  | 499 | 534 | 568 | 603 | 637 | 672 | 706 |
| 48 | 118 |  |  |  |  |  |  | 492 | 531 | 570 | 609 | 647 | 686 |
| 50 | 122 |  |  |  |  |  |  |  | 493 | 536 | 580 | 623 | 667 |
| 52 | 126 |  |  |  |  |  |  |  |  | 517 | 561 | 604 | 646 |
| 54 | 129 |  |  |  |  |  |  |  |  | 498 | 541 | 585 | 629 |
| 56 | 133 |  |  |  |  |  |  |  |  |  | 523 | 566 | 610 |
| 58 | 136 |  |  |  |  |  |  |  |  |  | 503 | 547 | 590 |
| 60 | 140 |  |  |  |  |  |  |  |  |  | 485 | 528 | 571 |
| 62 | 144 |  |  |  |  |  |  |  |  |  |  | 513 | 555 |
| 64 | 147 |  |  |  |  |  |  |  |  |  |  | 498 | 536 |
| 66 | 151 |  |  |  |  |  |  |  |  |  |  |  | 521 |
| 68 | 154 |  |  |  |  |  |  |  |  |  |  |  | 505 |
| 70 | 158 |  |  |  |  |  |  |  |  |  |  |  | 488 |

TABLE 1b

CO2 - Temp/Pressure/Density Chart (kg/m3)

| Temp-C. | Temp-F. | Pressure 2200 | Pressure 2300 | Pressure 2400 | Pressure 2500 | Pressure 2600 | Pressure 2700 | Pressure 2800 | Pressure 2900 | Pressure 3000 | Pressure 3100 | Pressure 3200 | Pressure 3300 |
|---|---|---|---|---|---|---|---|---|---|---|---|---|---|
| 24 | 75 | 882 | 888 | 893 | 898 | 903 | 908 | 913 | 919 | 922 | 926 | 930 | 934 |
| 26 | 79 | 871 | 877 | 882 | 887 | 893 | 898 | 904 | 909 | 913 | 917 | 921 | 925 |
| 28 | 82 | 860 | 866 | 871 | 877 | 883 | 888 | 894 | 900 | 904 | 908 | 913 | 917 |
| 30 | 86 | 848 | 854 | 860 | 867 | 873 | 879 | 885 | 891 | 895 | 899 | 904 | 908 |
| 31 | 88 | 842 | 848 | 854 | 861 | 867 | 873 | 879 | 885 | 890 | 895 | 899 | 904 |
| 32 | 90 | 835 | 842 | 848 | 855 | 861 | 868 | 874 | 880 | 885 | 890 | 894 | 899 |
| 34 | 93 | 822 | 829 | 836 | 843 | 850 | 856 | 863 | 870 | 875 | 880 | 885 | 890 |
| 36 | 97 | 809 | 816 | 823 | 831 | 838 | 845 | 853 | 860 | 865 | 870 | 875 | 880 |

TABLE 1b-continued

CO2 - Temp/Pressure/Density Chart (kg/m3)

| Temp- C. | Temp- F. | Pressure 2200 | Pressure 2300 | Pressure 2400 | Pressure 2500 | Pressure 2600 | Pressure 2700 | Pressure 2800 | Pressure 2900 | Pressure 3000 | Pressure 3100 | Pressure 3200 | Pressure 3300 |
|---|---|---|---|---|---|---|---|---|---|---|---|---|---|
| 38 | 100 | 796 | 803 | 811 | 819 | 827 | 834 | 842 | 850 | 855 | 861 | 866 | 871 |
| 40 | 104 | 782 | 791 | 799 | 807 | 815 | 823 | 832 | 840 | 845 | 851 | 856 | 862 |
| 42 | 108 | 766 | 775 | 784 | 793 | 802 | 811 | 820 | 829 | 835 | 840 | 846 | 852 |
| 44 | 111 | 750 | 700 | 770 | 779 | 789 | 798 | 808 | 818 | 824 | 830 | 836 | 842 |
| 46 | 115 | 734 | 745 | 755 | 765 | 776 | 786 | 796 | 807 | 813 | 819 | 826 | 832 |
| 48 | 118 | 719 | 730 | 741 | 752 | 762 | 773 | 784 | 795 | 802 | 809 | 815 | 822 |
| 50 | 122 | 703 | 714 | 726 | 738 | 749 | 761 | 773 | 784 | 791 | 798 | 805 | 812 |
| 52 | 126 | 684 | 696 | 709 | 722 | 734 | 747 | 760 | 772 | 779 | 787 | 794 | 801 |
| 54 | 129 | 665 | 678 | 692 | 706 | 719 | 733 | 746 | 760 | 768 | 775 | 783 | 791 |
| 56 | 133 | 646 | 660 | 675 | 690 | 704 | 719 | 733 | 748 | 756 | 764 | 772 | 780 |
| 58 | 136 | 627 | 642 | 658 | 674 | 689 | 705 | 720 | 736 | 744 | 753 | 761 | 769 |
| 60 | 140 | 608 | 624 | 641 | 658 | 674 | 691 | 707 | 724 | 732 | 741 | 750 | 758 |
| 62 | 144 | 590 | 608 | 625 | 642 | 659 | 676 | 694 | 711 | 720 | 729 | 738 | 747 |
| 64 | 147 | 573 | 591 | 609 | 626 | 644 | 662 | 680 | 698 | 707 | 717 | 726 | 736 |
| 66 | 151 | 555 | 574 | 592 | 611 | 629 | 648 | 666 | 685 | 695 | 705 | 715 | 724 |
| 68 | 154 | 538 | 557 | 576 | 595 | 614 | 633 | 653 | 672 | 682 | 692 | 703 | 713 |
| 70 | 158 | 520 | 540 | 560 | 580 | 599 | 619 | 639 | 659 | 670 | 680 | 691 | 702 |

TABLE 2

Calculation of Thermodynamic State Variables of Carbon Dioxide

| Lower limit for calculation: | upper limit: 900 C, 1000 bar | |
|---|---|---|
| −55 C, 1 bar | | |
| Pressure: | 2000 psi (lb/inch2) | |
| Temperature: | 40 Celsius | |
| Calculate | | |

| Property | Value | Unit |
|---|---|---|
| Medium : | carbon dioxide | |
| state of aggregation: | overcritical fluid | |
| Pressure: | 137.9 | [ bar ] |
| Temperature: | 40 | [ Celsius ] |
| Density: | 743.6128 | [ kg/m$^3$ ] |
| Specific Enthalpy: | 292.155 | [ kJ/kg ] |
| Specific Entropy: | 1.27262 | [ kJ/kg K ] |
| Specific isobar heat capacity: cp | 3.395096 | [ kJ/kg K ] |
| Specific isochor heat capacity: cv | 0.9539754 | [ kJ/kg K ] |
| Isobar coefficient of thermal expansion: | 15.18083 | [ 10$^{-3}$ (1/K) ] |
| Heat conductance | 83.66994 | [ 10$^{-3}$ (W/m * K) ] |
| Dynamic viscosity: | 62.9621 | [ 10$^{-6}$ (pa s) ] |
| Kinematic viscosity: | 0.084670543594731 | [ 10$^{-6}$ m$^2$/s] |
| Thermal diffusivity: | 0.3659832 | [ 10$^{-7}$ m$^2$/s] |
| Prandtl-Number: | 2.4712 | |
| Coefficient of compressibility Z: | 0.3114238 | |
| speed of sound: | 389.2818 | [m/s] |

Once the correlation table is created, the weight of liquid $CO_2$ required to fill up to the desired capacity of an extraction vessel of known internal volume, can be calculated using conversion tables such as the one published by Universal Industrial Gases, Inc. of Easton, Pa. http://www.uigi.com/co2_conv.html, as shown in the Table 3 below.

TABLE 3

Unit Conversion Data for Carbon Dioxide

| | Weight | | | Gas | | Liquid | | Solid |
|---|---|---|---|---|---|---|---|---|
| | pounds (lb) | tons (t) | kilograms (kg) | cubic feet (scf) | cu meters (Nm$^3$) | gallons (gal) | liters (l) | cubic feet (cu ft) |
| 1 pound | 1.0 | 0.0005 | 0.4536 | 8.741 | 0.2294 | 0.11806 | 0.4469 | 0.010246 |
| 1 short ton | 2000.0 | 1.0 | 907.2 | 17483 | 458.8 | 236.1 | 893.9 | 20.49 |
| 1 kilogram | 2.205 | 0.0011023 | 1.0 | 19.253 | 0.5058 | 0.2603 | 0.9860 | 0.226 |
| 1 scf gas | 0.1144 | — | 0.05189 | 1.0 | 0.02628 | 0.013503 | 0.05113 | 0.0011723 |
| 1 Nm$^3$ gas | 4.359 | 0.00218 | 1.9772 | 38.04 | 1.0 | 0.5146 | 1.948 | 0.04468 |
| 1 gal liquid | 8.470 | 0.004235 | 3.842 | 74.04 | 1.9431 | 1.0 | 3.785 | 0.08678 |
| 1 liter liquid | 2.238 | 0.0011185 | 1.0151 | 19.562 | 0.5134 | 0.2642 | 1.0 | 0.02293 |
| 1 cu ft (solid) | 97.56 | 0.0488 | 44.25 | 852.8 | 22.38 | 11.518 | 43.60 | 1.0 |

$CO_2$ liquid measured at 21.42 atmospheres and 1.7° F. $CO_2$ solid measured at 109.25° F.
Scf (standard cubic foot) gas measured at 1 atmosphere and 70° F.
Nm$^3$ (normal cubic meter) gas measured at 1 atmosphere and 0° C.
Liquid measured at 1 atmosphere and boiling temperature.

The amount of $CO_2$ loaded in to the extraction vessel can be measured directly via a weighing scale provided in association with the extraction vessel, or indirectly by measuring weight loss in liquid $CO_2$ supply tank.

Once the desired density of the liquid-phase $CO_2$ in the extraction vessel is achieved, the extraction vessel is heated to achieve supercritical-phase $CO_2$ at desired predetermined pressure and temperature. In some embodiments, the extraction vessel is heated by circulating a heat transfer fluid, which is heated to a temperature higher than the temperature of the extraction vessel. In some embodiments the extraction vessel is immersed in a fluid bath containing a heat transfer fluid, heated to a temperature higher than the temperature of the extraction vessel.

In some embodiments, the desired pressure is between 750 psi and 5,000 psi, and the desired temperature is between 24° C. and 75° C. The supercritical-phase $CO_2$ is allowed to reside in the extraction vessel for a time sufficient to ensure impregnation of one or more components from the plant material in the supercritical-phase $CO_2$. After achieving impregnation of supercritical-phase $CO_2$ with one or more components extracted from the plant material, the extraction vessel is cooled and the impregnated supercritical-phase $CO_2$ in the extraction vessel is converted to the impregnated liquid-phase $CO_2$.

The impregnated liquid-phase $CO_2$ is transferred into a collection vessel, wherein density of the liquid-phase $CO_2$ is decreased to convert the liquid-phase $CO_2$ into gaseous-phase $CO_2$, thereby allowing the impregnated components to be separated. In some embodiments, the liquid-phase $CO_2$ impregnated with one or more components is flushed into a collection vessel. The flushing effect of the liquid $CO_2$ enhances the movement of the solute from the extraction vessel to the collection vessel thus increasing the efficiency of the extraction. This is particularly effective when the desired components are surface-resident on the plant material.

In some embodiments, the gaseous-phase $CO_2$ that is exhausted from the collection vessel is collected and cooled in a recapture tank for re-use in the extraction process. In some embodiments, the gaseous-phase $CO_2$ is collected in pre-cooled recapture tank.

The present invention provides a temperature differential "pump" wherein the temperature differential between the $CO_2$ supply and the extraction vessel is utilized to achieve desired density of $CO_2$ in the extraction vessel, rather than the use of mechanical pumps to continuously "brute force" the density, and bulk flow rate to move the extracts to the collector. An additional economic benefit of being able to quickly heat and cool the extraction vessel is that multiple cycles can be run during an operating day.

It is believed that the temperature differential slows down the relative molecular movement of the $CO_2$ between the liquid $CO_2$ supply and the extraction vessel during loading, which makes the $CO_2$ more dense and allows more molecules to move into the same space at the lower temperature, thereby increasing density within a volume that would normally not be fillable with the higher density without the temperature differential.

In some embodiments, the process of the present invent comprises: a) providing a liquid-phase $CO_2$ supply at a known temperature; b) providing a predetermined amount of the plant material in a pressure regulated extraction vessel having known/constant volume; c) heating the a liquid-phase $CO_2$ supply, and cooling the extraction vessel thereby creating a temperature differential between the liquid-phase $CO_2$ supply and the extraction vessel, wherein the extraction vessel temperature is lower than the temperature of the liquid-phase $CO_2$ supply; d) allowing $CO_2$ from the liquid-phase $CO_2$ to flow into the extraction vessel due to the temperature differential, while maintaining the temperature differential between the liquid-phase $CO_2$ supply and the extraction vessel to load a target amount of the $CO_2$ to achieve a desired density of $CO_2$ in the extraction vessel; e) heating the extraction vessel to achieve supercritical-phase $CO_2$ at desired predetermined pressure and temperature; f) allowing the supercritical-phase $CO_2$ to reside in the extraction vessel at the predetermined temperature and pressure achieved in step e) for a time sufficient to ensure impregnation of the one or more components in the supercritical-phase $CO_2$; g) cooling the component-impregnated supercritical-phase $CO_2$ so that the component impregnated supercritical-phase $CO_2$ in the extraction vessel changes to component-impregnated liquid-phase $CO_2$; h) transferring the component-impregnated liquid-phase $CO_2$ into a collection vessel and decreasing the density of the liquid-phase $CO_2$ to convert the liquid-phase $CO_2$ into gaseous-phase $CO_2$, thereby allowing the one or more components to be separated from the $CO_2$; i) optionally collecting and cooling the gaseous-phase $CO_2$ in a pre-cooled recapture tank and recycling same for the extraction process.

The process of the present invention can be applied to extraction methods involving other super critical fluids.

To gain a better understanding of the invention described herein, the following examples are set forth. It will be understood that these examples are intended to describe illustrative embodiments of the invention and are not intended to limit the scope of the invention in any way.

Figure 2:
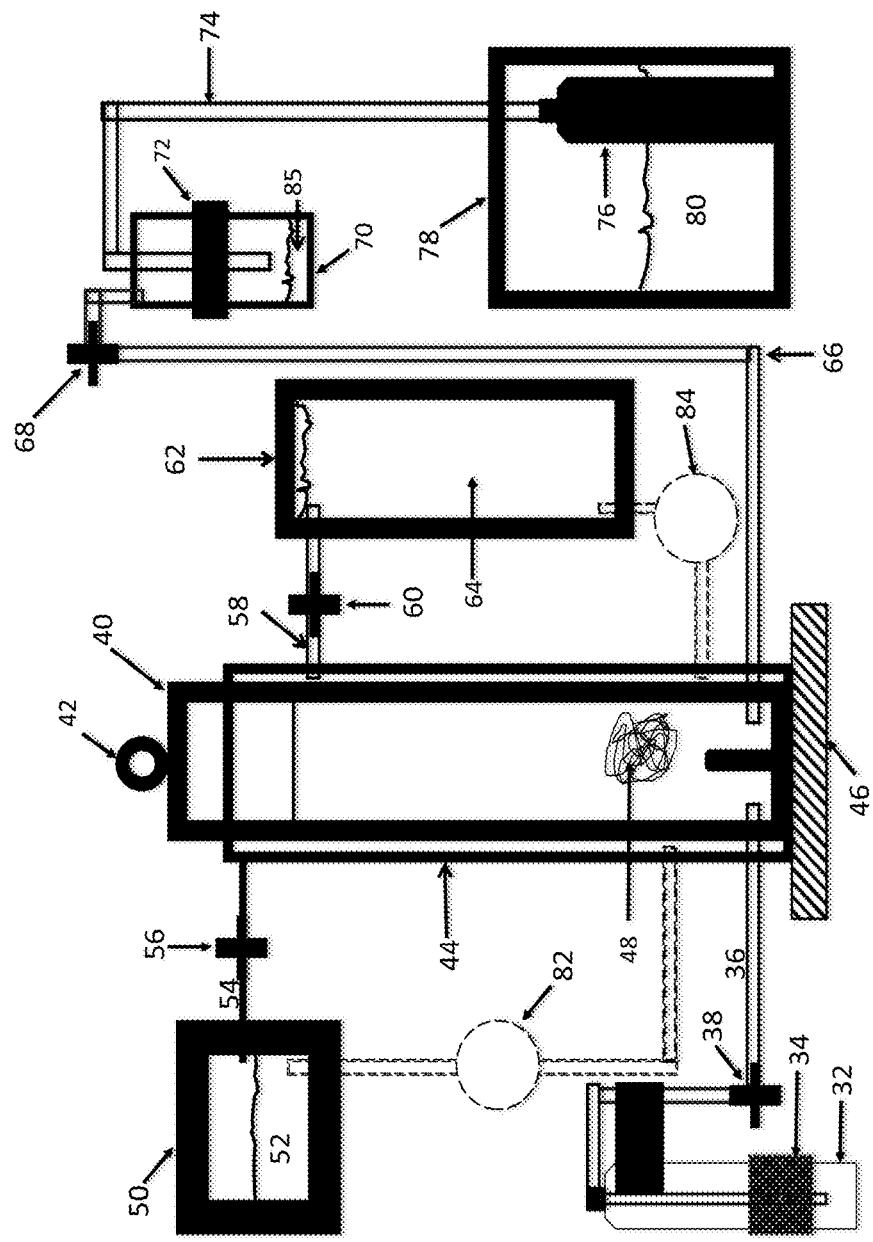
FIG. 2 illustrates a schematic representation of a $CO_2$ extraction plant involving the process in accordance to another embodiment of the present invention.

FIGS. 1 and 2 illustrate schematic representations of $CO_2$ extraction plants for conducting the process in accordance with exemplary embodiments of the present invention.

Example: 1

Referring to FIG. 1, a liquid $CO_2$ supply is obtained as a pressurized tank 2, which is connected fluidically to a pressure regulated extraction vessel 10 via loading Line 6 provided with a shutoff valve 8. Optionally liquid $CO_2$ supply tank 2 is placed in a warm fluid bath 4 to heat the liquid $CO_2$ in the pressurized tank 2 to a predetermined temperature.

In this example, the extraction vessel 10 is positioned in a fluid bath 14 which during $CO_2$ loading is filled with cold heat exchange fluid to remove heat thereby causing a decrease in the temperature of the extraction vessel, and creating a temperature differential between the warmer liquid $CO_2$ supply and the extraction vessel. The extraction vessel 10 is further fluidically connected to a collection vessel 24 via connector line 20 provided with a release valve 22. A recapture/exhaust line 26 connects the collection vessel 24 and the $CO_2$ recapture tank 28, which in this example is positioned in a cold fluid bath 30. The amount of liquid $CO_2$ being loaded into the extraction vessel is measured via a weighing scale 16.

In this example, the process is carried out by placing a predetermined amount of a plant material 18 in the pressure regulated extraction vessel 10, which is then sealed. Shutoff valve 8 is opened causing liquid $CO_2$ to flow from the liquid $CO_2$ supply tank 2 to the cooling extraction vessel 10. As the heat differential causes the liquid $CO_2$ to flow from the liquid $CO_2$ supply tank 2 to the extraction vessel 10, the weight of the liquid $CO_2$ in the extraction vessel rises and is monitored by the weigh scale 16 or weigh scale 31—the higher the weight in extraction vessel 10, the higher the $CO_2$ density level in the extraction vessel 10.

Once the desired amount of $CO_2$ is loaded into the extraction vessel 10 to achieve the desired density, the heat exchange fluid in fluid bath 14 is changed from cold to hot fluid, to heat the liquid-phase $CO_2$ in the extraction vessel at a predetermined pressure as indicated by the pressure gauge 12 to achieve supercritical-phase $CO_2$. The fluid temperature in the extraction vessel 10 and fluid bath 14 can be increased or decreased, and maintained as required by adding hotter or colder fluid.

Once the extraction vessel has reached the desired pressure, the supercritical-phase $CO_2$—and plant material 18 are allowed to reside in the extraction vessel for a desired length of time. Once the desired length of time has lapsed, the warm fluid in the extraction vessel fluid bath 14 is changed to cold fluid causing a cooling of the extractor vessel and a phase change from supercritical-phase $CO_2$ to liquid-phase $CO_2$ at a predetermined pressure as displayed by the pressure gauge 12. Once the phase change is complete, liquid-phase $CO_2$ impregnated with one or more extracted solute components is transferred from the extraction vessel to collection vessel 24 via collection line 20 regulated by relief valve 22. As the liquid $CO_2$ enters the collection vessel 24, the additional volume allows rapid reduction of the $CO_2$ density causing the liquid-phase $CO_2$ to change to gaseous phase $CO_2$ resulting in separation/precipitation of the impregnated/extracted components 29 from $CO_2$.

In some embodiments, the velocity of the evacuating liquid $CO_2$ also provides a flushing effect that carries extract from the plant material to the collection vessel 24, increasing the overall efficiency of the extraction process.

Gaseous $CO_2$ is then transferred to pre-cooled recapture tank 28 placed in a cooled fluid bath 30.

Once the weight of $CO_2$ in the extraction vessel declines to a predetermined weight, the extraction cycle is complete and the remaining gaseous $CO_2$ in the extraction vessel is "topped-up" for another extraction cycle on the same raw plant material, with the same or other $CO_2$ density/pressure, or the remaining $CO_2$ in the extraction vessel is vented and the extracted raw plant material is replaced for additional extraction cycles.

Example: 2

Referring to FIG. 2, a liquid $CO_2$ supply obtained as a pressurized tank 32 is fluidically connected to an extraction vessel 40 through loading line 36, provided with a shutoff valve 38. In this embodiment, the extraction vessel 40 is surrounded by a jacket 44 through which cooling fluid 52 from freezer 50 is circulated via connector line 54 provided with a valve 56 to remove heat and thereby causing a decrease in extraction vessel temperature and a temperature differential between the $CO_2$ supply and the extraction vessel. Optionally, heater 34 is provided to heat the liquid $CO_2$ in the pressurized tank 32 to a predetermined temperature.

The extraction vessel 40 is also fluidically connected to a heat reservoir 62 via a connector line 58 provided with a valve 60. The extraction vessel is further fluidically connected to a collection vessel 70 via connector line 66 provided with a release valve 68. A recapture line 74 connects the collection vessel 70 and the recapture tank 76, which in this example is placed in freezer 78 containing coolant 80.

Valves 56 and 60 are provided to facilitate switching of the circulating fluid from cold fluid to hot fluid to maintain the extraction vessel temperature in a predetermined range. Valves 38, 56, 60 and 68 are operated manually or electromechanically. In an alternative example, the valves are programmed for automatic operation.

The coolant jacket 44 is sealed or open to the atmosphere and the circulation of the cool and/or hot heat transfer fluid is caused by available pressurized hot/cold heat transfer fluid supply. In an alternative example, the circulation of the cool and/or hot heat transfer fluid is further supplemented with local pumps, such as 82 and 84.

In this example, the process is carried out by placing a predetermined amount of a plant material 48 in the pressure regulated extraction vessel 40, which is then sealed. Shutoff valve 56 is opened and coolant 52 is circulated through the coolant jacket 44 causing a transfer of heat from the extraction vessel to freezer 50.

Valve 38 is then opened causing liquid $CO_2$ to flow from the liquid $CO_2$ supply 32 to the cooling extraction vessel 40. As the liquid $CO_2$ flows through the loading line 36, it adds heat to the extraction vessel 40, which is removed by the circulating coolant 52 and transferred to freezer 50. As the heat differential causes the $CO_2$ to flow from the $CO_2$ supply 32 to the extraction vessel 40, the weight of the $CO_2$ in the extraction vessel rises and is monitored by the weigh scale 46—the higher the weight, the higher the $CO_2$ density level in the extraction vessel. Once the loaded $CO_2$ reaches a predetermined amount to achieve a desired density, shutoff valve 56 and shutoff valve 38 are closed, and shutoff valve 60 is opened causing circulation of the hot heat transfer fluid 64 through the coolant jacket 44. The plant material and $CO_2$ in the extraction vessel are heated by the circulating hot fluid up to a predetermined pressure as indicated by the pressure gauge 42 to achieve supercritical-phase $CO_2$.

Once the desired pressure is reached, shut off valve 60 is closed, and the supercritical-phase $CO_2$ and plant material 48 allowed to reside in the extraction vessel for a predetermined time. If the extraction vessel pressure falls below the desired value, valve 60 is re-opened to add heat.

Once the predetermined resident time has elapsed, shutoff valve 60 is closed, shutoff valve 56 is opened to circulate cooled fluid 52 through the coolant Jacket 44 to cool the extraction vessel to the point that the supercritical-phase $CO_2$ in the extraction vessel changes to liquid-phase $CO_2$ at a predetermined pressure as displayed by the pressure gauge 42.

Once the supercritical-phase $CO_2$ in the extraction vessel is converted to liquid-phase $CO_2$, shutoff valve 56 is closed. Shutoff valve 68 is then modulated to release liquid-phase $CO_2$ impregnated with one or more solute components to collection vessel 70, where the liquid-phase $CO_2$ changes to gaseous-phase $CO_2$, and the impregnated components 85 get separated from $CO_2$. Gaseous $CO_2$ is then transferred to pre-cooled recapture tank 76 placed in coolant 80 in freezer 78.

Optionally, band heat 72 provides heat to the gaseous-phase $CO_2$, accelerating the flow of solute-free gaseous $CO_2$ along the recapture line 74, and into the pre-cooled recapture tank 76 placed in coolant 80 in freezer 78.

Once the weight of $CO_2$ in the extraction vessel declines to a predetermined weight, the extraction cycle is complete and the remaining $CO_2$ in the extraction vessel is "topped-up" for another extraction cycle on the same raw plant material, with the same or other $CO_2$ density/pressure, or the remaining $CO_2$ in the extraction vessel is vented and the extracted raw plant material is changed for additional extraction cycles.

As evident from the above discussion, the present invention provides a cost effective, simplified extraction process, which eliminates the number of mechanical pumps in the density control process.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

The embodiments of the invention in which an exclusive property or privilege is claimed are defined as follows:

1. A process of extracting one or more components from a plant material, the process comprising:
   a) providing a liquid-phase $CO_2$ supply at a known temperature;
   b) providing a predetermined amount of the plant material in a pressure regulated extraction vessel having known/constant volume;
   c) creating a temperature differential between said liquid-phase $CO_2$ supply and the extraction vessel, wherein the extraction vessel temperature is lower than the temperature of the liquid-phase $CO_2$ supply;
   d) allowing $CO_2$ from liquid-phase $CO_2$ supply to flow into the extraction vessel due to the temperature differential, while maintaining the temperature differential between the liquid-phase $CO_2$ supply and the extraction vessel to load a target amount of the $CO_2$ to achieve a desired density of $CO_2$ in the extraction vessel;
   e) heating said extraction vessel to achieve supercritical-phase $CO_2$ at desired predetermined pressure and temperature;
   f) allowing said supercritical-phase $CO_2$ to reside in said extraction vessel at said predetermined temperature and pressure achieved in step e) for a time sufficient to ensure impregnation of the one or more components in the supercritical-phase $CO_2$;
   g) cooling said component-impregnated supercritical-phase $CO_2$ so that the component-impregnated supercritical-phase $CO_2$ in the extraction vessel changes to component-impregnated liquid-phase $CO_2$; and
   h) transferring said component-impregnated liquid-phase $CO_2$ into a collection vessel at a pressure lower than that of the extraction vessel and/or into a collection vessel with higher available volume, thereby decreasing the density of said liquid-phase $CO_2$ to convert said liquid-phase $CO_2$ into gaseous-phase $CO_2$, thereby allowing the one or more components to be separated from the $CO_2$.

2. The process of claim 1, wherein said liquid-phase $CO_2$ supply is obtained at a temperature same or similar as the temperature of the extraction vessel, and the temperature differential is created by heating the liquid-phase $CO_2$ supply to a predetermined temperature above the temperature of the extraction vessel and/or cooling the extraction vessel before and/or during the loading of the liquid-phase $CO_2$ into the extraction vessel.

3. The process of claim 1, wherein said liquid-phase $CO_2$ supply is obtained at a temperature lower that the temperature of the extraction vessel, and the temperature differential is created by first heating said liquid-phase $CO_2$ supply to a predetermined temperature above the temperature of the extraction vessel, optionally followed by cooling the extraction vessel before and/or during loading of the liquid-phase $CO_2$ into the extraction vessel.

4. The process of claim 1, wherein said liquid-phase $CO_2$ supply is obtained at a temperature higher than the initial temperature of the extraction vessel, thereby creating the desired temperature differential, and optionally cooling the extraction vessel before and/or during the loading of the liquid-phase $CO_2$ into the extraction vessel.

5. The process of claim 1, wherein said extraction vessel is cooled via a heat transfer fluid.

6. The process of claim 5, wherein said heat transfer fluid is one or more of air, water, ethylene glycol, diethylene glycol, propylene glycol, mineral oils, or silicone oils.

7. The process of claim 1, wherein said desired density is about 700 kg/m³ to about 850 kg/m³.

8. The process of claim 1, wherein said predetermined amount of liquid-phase $CO_2$ in step d) is between 66% and 100% of the volume available in the extraction vessel containing the plant material.

9. The process of claim 1, wherein in step e) the predetermined pressure is between 750 psi and 5,000 psi and the temperature is between 24° C. and 75° C.

10. The process of claim 1, further comprising collecting and cooling said gaseous-phase $CO_2$ in a pre-cooled recapture tank and recycling same for the extraction process.

* * * * *